April 6, 1954 P. H. MANNING 2,674,226
EGG TRAP NEST AND STORAGE APPARATUS
Filed Jan. 12, 1949 2 Sheets-Sheet 2
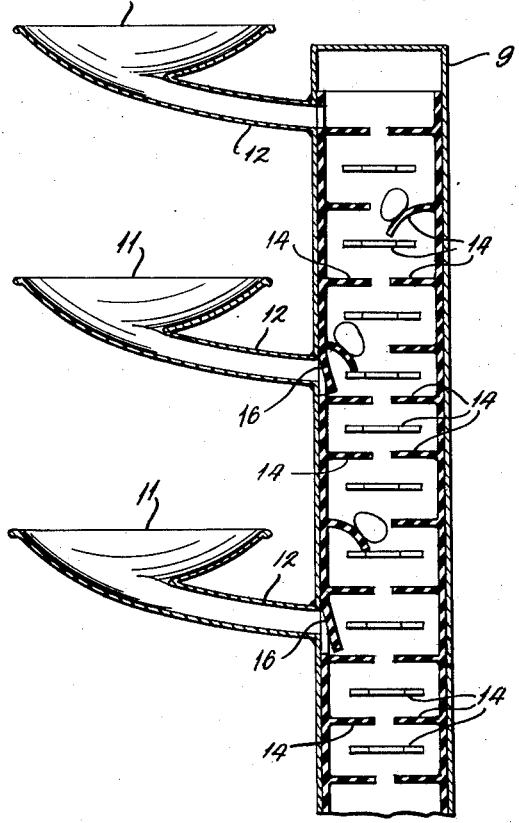
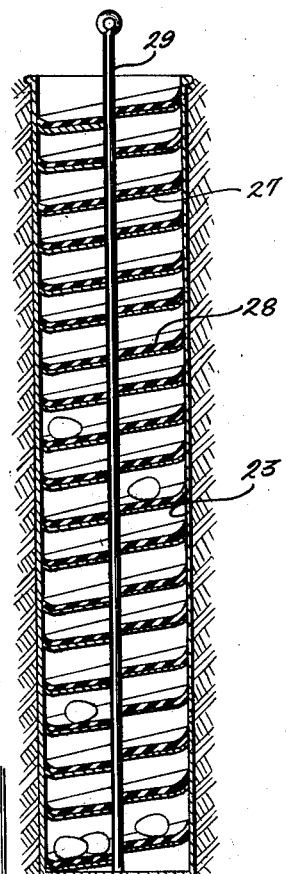
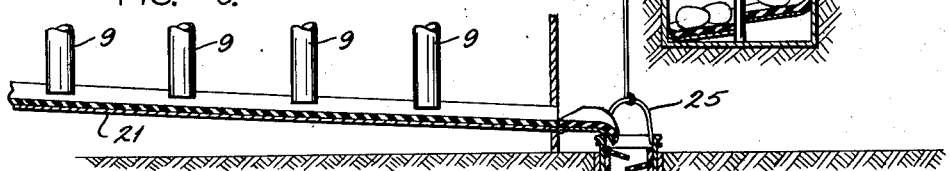
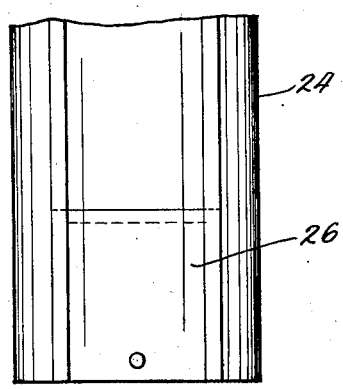
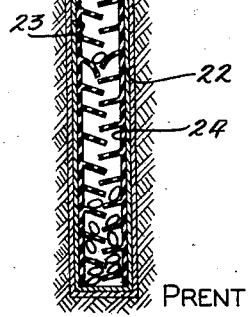
INVENTOR:
PRENTICE H. MANNING
ATTORNEYS.

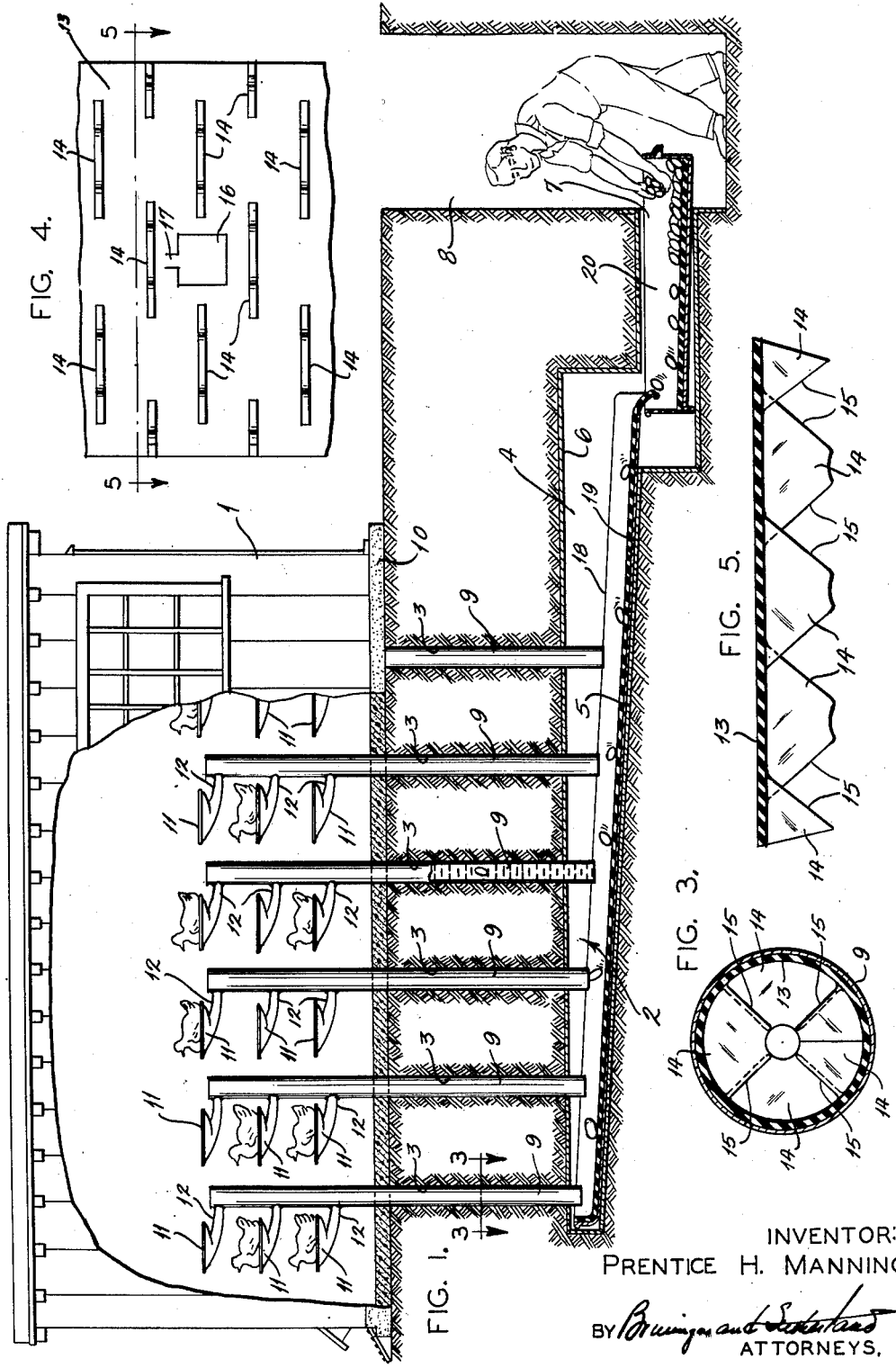

Patented Apr. 6, 1954

2,674,226

UNITED STATES PATENT OFFICE 2,674,226

EGG TRAP NEST AND STORAGE APPARATUS

Prentice H. Manning, Jerseyville, Ill.; Therese H. Manning, executrix of said Prentice H. Manning, deceased Application January 12, 1949, Serial No. 70,455

14 Claims. (Cl. 119—48)

This invention relates generally to egg handling apparatus, and particularly to means for automatically collecting newly-laid eggs, cooling and storing them.

Collecting eggs from individual nests is a tedious and time-consuming task. Furthermore, it is well known that the temperatures normal to most of the world have a very deleterious effect upon eggs, temperatures above 69° F. leading to germination if the eggs be fertile, and deterioration in any event, and temperatures below 30° F. causing freezing. Unless, therefore, eggs are collected very soon after being laid, which is often impossible or at least inconvenient, some deterioration is certain to occur.

One object of the present invention, then, is to provide a simple, efficient apparatus for automatically transferring newly-laid eggs to a central cooling and storage chamber.

Another object is to provide a chamber in which the temperature is always cool and is, with respect to the local atmospheric temperature, relatively uniform.

Another object is to provide a central collecting chamber from which eggs may be conveniently collected.

Another object is to provide means for protecting the cooled eggs from freezing temperature.

A further object is to provide a baffled conduit lining for controlling the descent through a vertical space of such frangible objects as eggs.

Further objects will appear from the following description, taken in connection with the accompanying drawings, in which:

Figure 1 is an elevational view, partly in section, showing one form of installation of the egg collecting device;

Figure 2 is an enlarged vertical sectional view taken on a medial plane of a vertical column and its attached nests;

Figure 3 is a section on line 3—3 of Figure 1;

Figure 4 is a development view of the lining of the vertical columns before being inserted therein;

Figure 5 is a section on line 5—5 of Figure 4;

Figure 6 is a sectional view of another form of the egg collecting device;

Figure 7 is a vertical section of a modified form of the device shown in Figure 6; and Figure 8 is a detail view of the lower end of the device shown in Figure 6.

In accordance with the present invention, eggs are automatically transferred from the laying nest to a subterranean collecting chamber. The chamber is at a sufficient depth beneath the ground so that the temperature never exceeds 69 degrees, nor falls below 32 degrees F. At a depth of six to eight feet below the surface of the earth, in most of the poultry raising areas, the temperature remains, throughout the year, uniformly in a range which insures rapid cooling of eggs and, at the same time, insures against their freezing. A summary of air and soil temperatures at Ames, Iowa, for the six years 1938 through 1943, for example, shows that although the temperature four feet about ground varied from a high of 102 degrees to a low of —25 degrees F., the temperature six feet below ground varied from a high of 65 to a low of 39 degrees F.

In practicing the invention, the henhouse is constructed either over or adjacent one or more holes extending below ground level for the appropriate depth, and arrangement is made for lowering the eggs quickly and safely from the nest above ground to the subterranean collection chamber. In particular, the invention contemplates one or more stacks, provided internally with a multiplicity of cushion baffles to control the descent of the eggs from the nest elevation to the lower elevation of the underground collection chamber.

For example, as shown in Figure 1, the henhouse 1 is constructed over an undermined area 2, and a plurality of bore holes 3 extend from the undermined area 2 to the henhouse 1. It is preferable to excavate the henhouse location to a depth sufficient to accommodate an underground housing 4 (consisting of a sloping floor 5 and a roof 6, together with suitable end and side walls, all of which are impervious to moisture and capable of withstanding the over-burden of earth, as well as the side pressures of the adjacent earth). The housing 4 has an access opening 7 located, in the embodiment shown, outside the henhouse 1 and at an elevation below ground, which may be reached through a pit 8. The housing 4 is provided with a plurality of stacks 9, extending vertically through the roof 6 thereof, and having their lower ends terminating short of the floor 5 of the housing 4. The housing is installed in the excavated area, and then the excavation refilled to the level upon which the foundation 10 of the henhouse 1 is to be laid.

The stacks 9 extend upwardly from the housing 4 through the foundation 10 of the henhouse, and may, if desired, constitute the supports for a plurality of nests 11, or the nests may otherwise be connected with the stacks, so that eggs deposited in the nests will be conveyed directly to one of the several stacks. In the embodiment shown, eggs deposited in the nest 11 pass through tubes 12 into stacks 9.

The several stacks 9, which may be of pipe or sheet metal, are lined internally with a cushioning material such as sponge rubber or other rubber-like material, to control and impede the descent of the eggs through the stacks 9. In the embodiment shown in Figures 2 to 5 inclusive, the lining consists of a sheet of sponge rubber 13, having a width corresponding to the interior circumference of the stack 9. Molded integrally with the sheet 13 is a series of baffles 14, arranged in staggered relation, and having their ends 15 tapered to avoid mutual fouling when the sheet 13 is rolled into a cylinder to fit within the stack 9, as shown in Figure 3. Adjacent the outlets forming tubes 12, the lining 13 may be slit to provide a door 16 having an integral connection 17, so that the door will readily open to permit an egg to pass from the tube 12 into the stack. If, however, at the instant an egg attempts to emerge from the tube 12 to the stack 9 another egg is passing down from above at the same elevation, the interior position of the door 16 will prevent the two eggs from colliding.

Arranged on the sloping floor 5 of the housing floor is a tray 18 covered with a suitable cushion material 19 such as sponge rubber. The tray 18 is so disposed as to receive the eggs from the lower ends of the several stacks 9, and sloped so that the eggs will roll downwardly toward a collecting drawer 20, whose bottom is likewise covered with cushion material.

Referring now to Figure 6, another embodiment is shown, which is adaptable to smaller scale operations, and eliminates the necessity of undermining the henhouse. In this embodiment, the several stacks 9 terminate above ground, with their lower ends arranged to discharge onto a cushioned ramp 21, which leads to a bore hole 22, sunk to an appropriate depth so that the bottom of the bore hole is situated at a depth where the earth temperature is within the desirable range aforesaid. The bore hole 22 is lined with a casing 23, sufficiently rugged to withstand the earth pressures and impervious to moisture. Seated within the casing 23 is an elongated bucket 24, having a bail 25 at the top thereof. The bucket 24 is lined with a suitable cushioning material, and provided with internal yieldable baffles, preferably made of rubber-like material, in order to retard the fall of eggs therethrough. In this embodiment, the eggs are collected in the bottom of bucket 24, which may be lifted out of the casing 23, and recovered therefrom through a door 26, located near the bottom, as shown in detail in Figure 8.

In lieu of the internally baffled bucket 24, the casing 23 may be fitted with a helical flight member 27, the upper surfaces of the flight being covered with a suitable cushion material 28 such as rubber, which may be sprayed on. The outer peripheral members of the flight 27 are preferably curved upwardly, to retard the impact of the eggs passing therethrough against the side walls of casing 23. The flight is sloped at an angle such that the eggs will continue to roll to the bottom thereof. When it is desired to recover the eggs, the flight member 27 is withdrawn from the casing 23 by means of a rod 29.

From the foregoing description, those skilled in the art will readily understand the construction and operation of the invention, and realize that it provides for the automatic collection and temporary storage of eggs immediately upon being laid, and insures against their deterioration by retaining them (while awaiting collection) at a location in the earth where the temperatures are uniformly in a range where eggs do not rapidly deteriorate.

While a complete disclosure of one embodiment has been given, and while alternatives have been suggested, it is not to be misunderstood that the invention is limited to the declaration of the embodiments thus disclosed, but on the contrary that the invention is susceptible of many and varied modifications and adaptations, without departing from the spirit thereof, or the scope of the appended claims.

Having thus described the invention, what is claimed and desired to be secured by Letters Patent is:

1. Apparatus of the character described, comprising nests, hollow columns supporting said nests, the interior of said columns communicating with the interior of said nests, baffles in said columns, and a central storage and cooling chamber, the interior of said columns communicating with the interior of said chamber, the lower portion of the columns, and the cooling and storage chambers extending below the surface of the earth to a depth at which the temperature does not exceed 69° nor fall below 32° F.

2. Apparatus of the character described, comprising nests, hollow columns supporting said nests, the interior of said columns communicating with the interior of said nests, baffles in said columns, and a central storage and cooling chamber, the interior of said columns communicating with the interior of said chamber, the cooling and storage chamber extending below the surface of the earth to a depth at which the temperature does not exceed 69° nor fall below 32° F.

3. In an apparatus for collecting and storing newly-laid eggs, a storage chamber comprising, a casing, a withdrawable container slidably fitted within the casing, said container having a cushion lining and flexible baffles arranged thereon, the casing being sunk into the ground to a depth at which the temperature does not exceed 69° nor fall below 32° F.

4. In an apparatus for collecting and storing newly-laid eggs, nests, a storage chamber disposed sufficiently below the nests that when the nests are above ground level the storage chamber is underground at a depth where the temperature is uniformly in the range of 33° to 69° F., a conduit, communicating with the interior of said nests and with the interior of said storage chamber for conducting eggs from the nests to the chamber, and fall retarding means in the conduit.

5. The apparatus of claim 4 wherein the storage chamber has an earth sustaining roof.

6. The apparatus of claim 4 wherein the storage chamber is a casing whose walls are resistant to earth pressures.

7. Apparatus for receiving eggs from nests comprising a storage chamber having a roof adapted to sustain an over-burden of earth, a sufficient overburden of earth to insure that the temperature of said storage chamber remains in the range of 33° to 69° F., a conduit communicating with the interior of said storage chamber, extending vertically from the storage chamber and arranged to receive eggs from the nests, and means within the conduits for retarding the fall of eggs therethrough.

8. The apparatus of claim 7 wherein the roof, floor and walls of the storage chamber are impervious to moisture and capable of withstanding earth pressures, said chamber having an access opening at its lowest point.

9. The apparatus of claim 7 wherein the chamber is provided with a plurality of spaced conduits, and a floor which slopes away from the mouths of the conduits, said floor having a cushion covering.

10. In an apparatus for collecting and storing newly laid eggs, nests, a storage chamber disposed below the surface of the earth at a depth where the temperature is uniformly in the range of 33° to 69° F., conduit communicating with the interior of said nests and with the interior of said storage chamber for conducting eggs from the nests to the storage chamber, and fall retarding means in said storage chamber.

11. In an apparatus for collecting and storing newly laid eggs, the combination of nests, a storage chamber disposed below the surface of the earth at a depth where the temperature is uniformly in the range of 33° to 69° F., conduit communicating with the interior of said nests and with the interior of said storage chamber for conducting eggs from the nests to the storage chamber, and fall retarding means in said conduit, said fall retarding means comprising a lining having integral with one of its surfaces a series of spaced flexible projections, said projections being spaced in staggered relation to one another.

12. In an apparatus for collecting and storing newly laid eggs, the combination of nests, a storage chamber comprising a casing, a spiral flight slidably fitted therein, said spiral flight having an upturned flange around its perimeter and being coated with a cushion material, said storage chamber being disposed below the surface of the earth at a depth where the temperature is uniformly in the range of 33° to 69° F., and conduit communicating with the interior of said nests and with the interior of said storage chamber for conducting eggs from the nests to the storage chamber.

13. In an apparatus for collecting and storing newly laid eggs, including nests, a storage chamber and conduit extending from and connecting said nests to said storage chamber, the improvement consisting of a lining for said conduit, adapted to be rolled and inserted in said conduit, comprising a substantially flat sheet of rubber-like material, having integral with one of its surfaces a series of spaced flexible projections, said projections being spaced in staggered relation to one another.

14. For use in an apparatus for collecting newly laid eggs and for storing them below the surface of the earth at a depth at which the temperature does not exceed 69° nor fall below 32° F., a storage chamber comprising a casing, and a spiral flight slidably and withdrawably fitted therein, said spiral flight having an integral upturned flange around its perimeter and being coated with a cushion material.

References Cited in the file of this patent

UNITED STATES PATENTS

| Number | Name | Date |
| --- | --- | --- |
| 424,271 | Chapman | Mar. 25, 1890 |
| 833,249 | Schwab | Oct. 16, 1906 |
| 967,365 | Gordon | Aug. 16, 1910 |
| 973,921 | Dodge | Oct. 25, 1910 |
| 1,017,723 | Woodbridge | Feb. 20, 1912 |
| 1,111,310 | Leighton | Sept. 22, 1914 |
| 1,114,318 | Vasey | Oct. 20, 1914 |
| 1,133,436 | Gramling | Mar. 30, 1915 |
| 1,334,643 | Ansley | Mar. 23, 1920 |
| 1,429,461 | Shadinger et al. | Sept. 19, 1922 |
| 1,452,141 | Baxter | Apr. 17, 1923 |
| 1,556,456 | Steffen | Oct. 6, 1925 |
| 1,904,809 | Wagner et al. | Apr. 18, 1933 |
| 1,915,508 | York | June 27, 1933 |
| 2,264,156 | Apple | Nov. 25, 1941 |